United States Patent
Trautenberg

(12) 
(10) Patent No.: US 9,154,216 B2
(45) Date of Patent: Oct. 6, 2015

(54) GENERATION OF A DATA STREAM COMPRISING USER MESSAGES IN A SATELLITE-BASED AUGMENTATION SYSTEM

(71) Applicant: Astrium GmbH, Taufkirchen (DE)

(72) Inventor: Hans Trautenberg, Cologne (DE)

(73) Assignee: Astrium GmbH, Taufkirchen (DE)

( * ) Notice: Subject to any disclaimer, the term of this patent is extended or adjusted under 35 U.S.C. 154(b) by 266 days.

(21) Appl. No.: 13/859,788

(22) Filed: Apr. 10, 2013

(65) Prior Publication Data

US 2013/0273955 A1 Oct. 17, 2013

(30) Foreign Application Priority Data

Apr. 12, 2012 (DE) .......................... 10 2012 007 201

(51) Int. Cl.
*H04B 7/00* (2006.01)
*H04B 7/185* (2006.01)
*G01S 19/05* (2010.01)
*G01S 19/02* (2010.01)
*G01S 19/07* (2010.01)
*G01S 19/08* (2010.01)

(52) U.S. Cl.
CPC ............ *H04B 7/18513* (2013.01); *G01S 19/02* (2013.01); *G01S 19/05* (2013.01); *G01S 19/07* (2013.01); *G01S 19/08* (2013.01)

(58) Field of Classification Search
CPC ....................................................... H04B 7/185
USPC .............. 455/509, 404.1, 404.2, 456.5, 456.6
See application file for complete search history.

(56) References Cited

U.S. PATENT DOCUMENTS

| | | | |
|---|---|---|---|
| 6,801,854 B1 | 10/2004 | Pemble et al. | |
| 7,184,744 B1 * | 2/2007 | Schnabel | 455/404.2 |
| 2005/0122260 A1 | 6/2005 | Dunas et al. | |

OTHER PUBLICATIONS

European Search Report dated Jun. 13, 2014 (six (6) pages).
J. Westbrook et al., "EGNOS Central Processing Facility Architecture and Design", GNSS Conference, 2000, (seventeen (17) pages).
3 EGNOS Architecture User Guide, p. 31-34, 2011.
German-language Office Action dated May 24, 2013 (six (6) pages).

* cited by examiner

*Primary Examiner* — Sanh Phu
(74) *Attorney, Agent, or Firm* — Crowell & Moring LLP

(57) ABSTRACT

In a satellite-based augmentation system a data stream is generated that includes user messages having different message types. A plurality of predetermined unique sequences of message types are formed and each formed sequence is allocated to one of a plurality of data sources that are used for generating user messages in the satellite-based augmentation system. A data source is selected for generating a data stream that includes user messages. The selected data source generates the data stream including user messages by using the predetermined unique sequence of message types that is allocated to the selected data source.

12 Claims, 2 Drawing Sheets

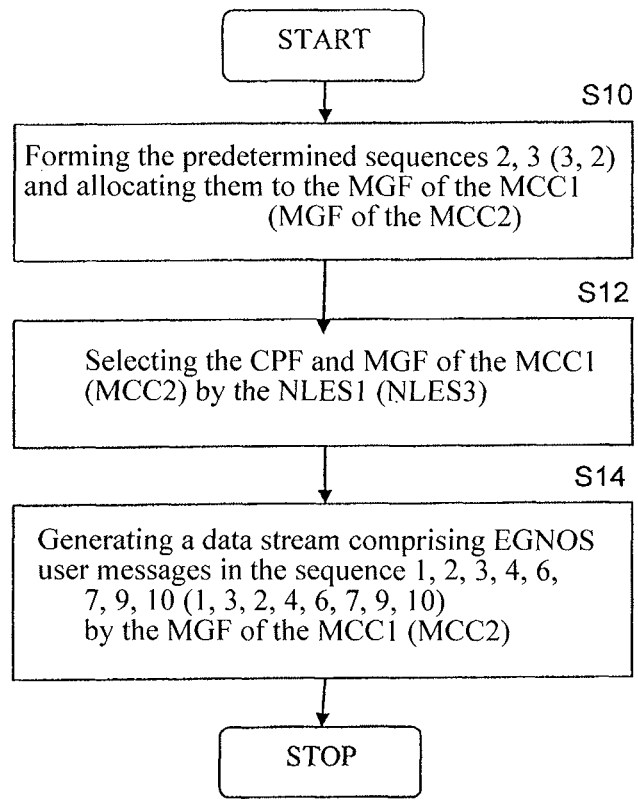
Fig. 2
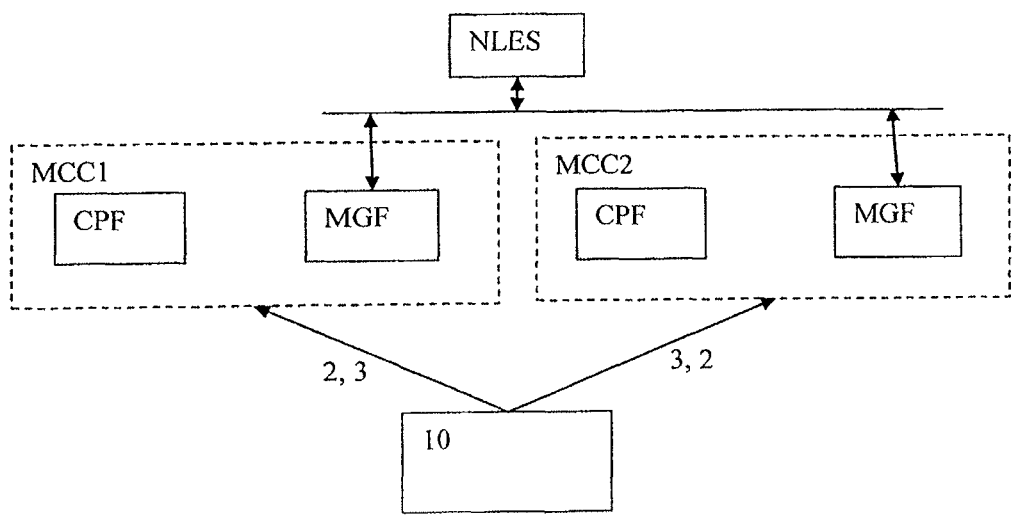
Fig: 3

GENERATION OF A DATA STREAM COMPRISING USER MESSAGES IN A SATELLITE-BASED AUGMENTATION SYSTEM

CROSS-REFERENCE TO RELATED APPLICATIONS

The present application claims priority under 35 U.S.C. §119 to German Patent Application No. 10 2012 007 201.5, filed Apr. 12, 2012, the entire disclosure of which is herein expressly incorporated by reference.

BACKGROUND AND SUMMARY OF THE INVENTION

Exemplary embodiments of the present invention relate to a method and a device for generating a data stream comprising user messages in a satellite-based augmentation system.

In order to increase the accuracy of position determination with a global navigation satellite system (GNSS: Global Navigation Satellite System) such as (NAVSTAR-) GPS, GLONASS or the future European navigation satellite system GALILEO, satellite-based augmentation systems (SBAS: Satellite Based Augmentation System) such as the European EGNOS (European Geostationary Navigation Overlay Service), the US-American WAAS (Wide Area Augmentation System) or the Japanese MSAS (Multifunctional Satellite Augmentation System) are used.

An SBAS uses additional satellites for a GNSS to be augmented, which satellites transmit regionally limited correction data that can be used by suitable receiver systems (SBAS receiver) of the GNSS for improving the accuracy of position determination. An augmentation system can also transmit integrity data or integrity information to the augmented GNSS, which allows the receivers to determine an integrity risk and to alert in the case of a risk that is too high. For example, besides correction data, EGNOS transmits also data on the integrity of GPS.

EGNOS comprises a network of 34 RIMS (Ranging and Integrity Monitoring Station), which receive navigation signals of the augmented GNSS, currently GPS and GLONASS. Correction and integrity data (EGNOS data) data are calculated from the data of the RIMS in four redundant MCCs (Master Control Center). The EGNOS data calculated by the MCC are transferred by six uplink stations NLES (Navigation Land Earth Station) in the form of GEO messages to the three geostationary EGNOS satellites (GEO satellites), which then distribute the EGNOS data in the form of a data stream comprising user messages to receiver systems. In addition, the EGNOS data are also made available through the Internet so that in the case of disturbed EGNOS satellite reception, receiver systems with Internet access still can receive current EGNOS data.

Calculating the EGNOS data in an MCC is carried out by a CPF (Central Processing Facility). The EGNOS message, which comprises EGNOS data, is generated by an MGF (Message Generation Facility) in the MCC and is provided for the transmission through the uplink stations NLES. Thus, each MCC generates with its CPF and MGF its own EGNOS messages which are available to the NLESs for transmission. Different types of EGNOS messages are defined. For example, EGNOS messages of the types 2-5 transmit corrections of the individual satellites of the augmented GNSS, and EGNOS messages of the type 6 transmit integrity information.

Each uplink station NLES selects from the different CPFs one particular CPF as a data source from which the uplink station takes the generated and provided EGNOS messages and transmits them to the EGNOS satellite controlled by said uplink station. The CPF selected by an NLES is designated as "selected" and the remaining CPFs are designated as "backup". A CPF designated as "selected" by an NLES transmits to the NLES a complete set of messages with all types of EGNOS messages, whereas the CPFs designated as "backup" transmit only integrity data (EGNOS message type 6) to the NLES. An NLES selects a certain CPF on the basis of a quality-of-service index and go/no-go flags provided by the CPF, which are transmitted separately to all NLESs by each CPF.

According to the current concept of EGNOS V2, it is not possible for a CPF and also for individual MGFs to determine via a data stream comprising EGNOS user messages which MGF and thus also which CPF has been selected by an NLES for generating GEO messages. For example, if one of the three EGNOS satellites receives a data stream comprising EGNOS user messages, it is not possible to determine on the basis of the EGNOS user messages which CPFs, and thus also MGFs, the NLES, which provides data to the EGNOS satellite, has selected as data sources from all CPFs and MGFs present in EGNOS.

Exemplary embodiments of the present invention provide a method and device for generating a data stream comprising user messages in a satellite-based augmentation system, wherein the data stream is suitable for identifying a data source used for generating user messages of a satellite-based augmentation system, in particular for identifying a CPF and an MGF selected by an NLES as a source for EGNOS user messages.

In accordance with exemplary embodiments of the present invention, a satellite-based augmentation system the data stream comprising user messages is encoded so as to indicate the augmentation system's data source used for generating the user messages. Here, encoding shall take place in such a manner that no additional interfaces have to be introduced. As a suitable encoding type, the invention proposes the sequence of different message types of the user messages in a data stream. As already explained above, in the case of the EGNOS, for example, corrections of the individual satellites of the augmented GNSS are transmitted with messages of the types 2-5. By allocating in each case a unique sequence of message types to data sources in the augmentation system, it is therefore possible that the data streams comprising user messages from the data sources can be configured differently so that identifying the data source used for a particular data stream comprising user messages is made possible. For example, in the case of EGNOS, different sequences of the message types 2-5 can be allocated to the data sources CPF and MGF available in EGNOS so that the CPF and the MGF, which were selected for generating the EGNOS user messages by the NLES which provides data to the EGNOS satellite, can be identified on the basis of the data stream comprising EGNOS user messages transmitted by an EGNOS satellite. Thus, each MGF and hence also each CPF can determine, based on a data stream comprising EGNOS, user messages which CPF and MGF were selected by an NLES for the respective EGNOS satellite.

One embodiment of the invention relates to a method for generating a data stream comprising user messages in a satellite-based augmentation system, wherein the user messages can exhibit different message types, and the method comprises the following steps:

Forming a plurality of predetermined unique sequences of message types and allocating each formed sequence to in each case one of a plurality of data sources that are used for generating user messages in the satellite-based augmentation system, Selecting a data source for generating a data stream comprising user messages, and Generating, by the selected data source, the data stream comprising user messages by using the predetermined unique sequence of message types that is allocated to the selected data source.

In particular, for forming unique sequences, such message types are used that have to be contained in each data stream comprising user messages.

In particular, message types provided for transmitting fast corrections of satellites of an augmented global navigation satellite system can be used as message types.

The number of the message types used can be selected based on the number of data sources that is allocated a unique sequence of message types.

The method is in particular suitable for the use in the augmentation system EGNOS V3 phase A.

Another embodiment of the invention relates to a computer program comprising a program code for carrying out all method steps according to the invention and as described herein if the computer program is executed in a computer.

Furthermore, one embodiment relates to a data carrier on which is stored the program code of the computer program according to the invention and as described above, which program code is executable by a computer.

Another embodiment of the invention relates to a device for generating a data stream comprising user messages in a satellite-based augmentation system, wherein the user messages can comprise different message types, and the device comprises the following:

first means for forming a plurality of predetermined unique sequences of message types and for allocating each formed sequence to in each case one of a plurality of data sources that are used for generating user messages in the satellite-based augmentation system, second means for selecting one of the data sources for generating a data stream comprising user messages, and third means for generating, by the selected data source, the data stream comprising user messages by using the predetermined unique sequence of message types that is allocated to the selected data source.

The device can be designed for carrying out a method according to the invention and as described herein.

Finally, one embodiment of the invention relates to a receiver for a data stream comprising user messages of a satellite-based augmentation system, which receiver is produced according to a method according to the invention and/or by a device according to the invention, wherein the receiver is designed so as to recognize in the received data stream a unique sequence of message types of user messages and to identify on the basis of the recognized unique sequence a data source of user messages.

Further advantages and possible uses of the present invention arise from the following description in connection with the exemplary embodiments illustrated in the drawings.

In the description, the claims, the abstract and in the drawings, the terms and associated reference numbers in the reference list below are used.

BRIEF DESCRIPTION OF THE DRAWING FIGURES

In the figures:

FIG. 2 shows a flow diagram of an exemplary embodiment of the method for generating a data flow comprising user messages in the SBAS shown in FIG. 1; and FIG. 3 shows an exemplary embodiment of a device for generating a data stream comprising user messages in an SBAS according to the invention.

DETAILED DESCRIPTION

Figure 1:
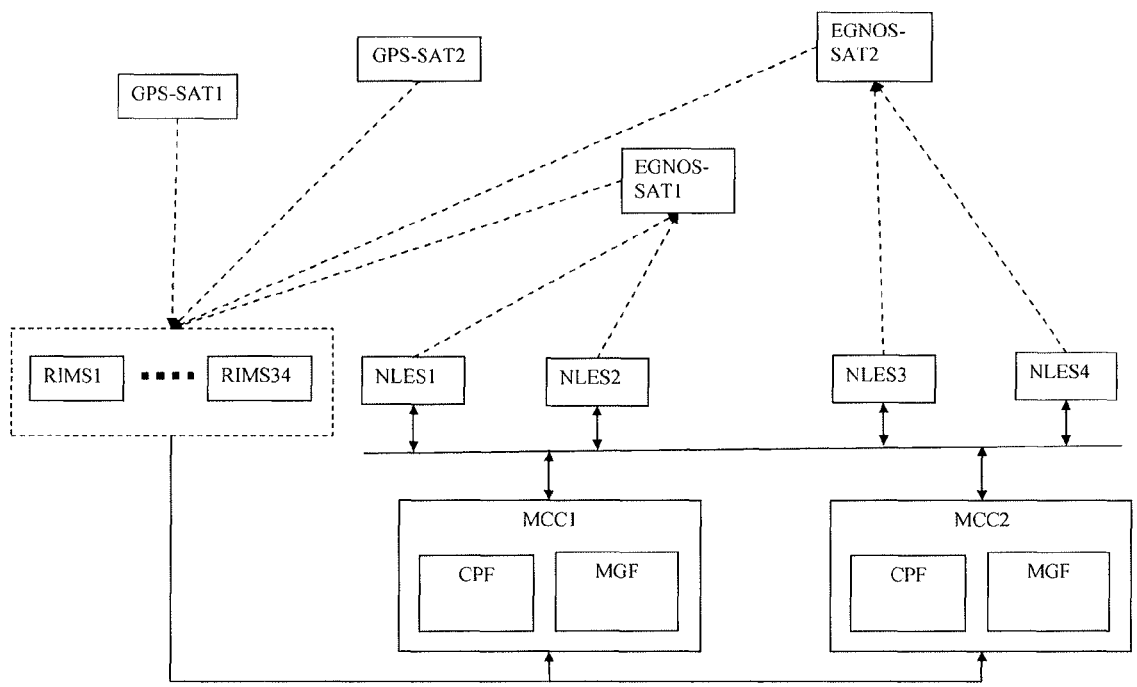
FIG. 1 shows a GNSS and an SBAS augmenting the same.

In the following description, identical, functionally identical and functionally connected elements can be designated by the same reference numbers. Hereinafter, absolute values are given only as an example and are not to be understood as limiting the invention.

The invention is explained below on the basis of EGNOS. However, the invention can be employed with any SBAS in which different data sources for generating user messages are provided and one of these data sources is selected for a data stream comprising user messages. Thus, the invention is not to be considered as being limited to EGNOS.

In FIG. 1, the architecture of the SBAS EGNOS that augments the GNSS GPS is outlined. For reasons of better clarity, the EGNOS architecture is not illustrated in its completed form. Instead of three geostationary EGNOS satellites, only two are shown, instead of four MCCs, only two are shown, and instead of six NLES, only four are shown.

A network of 34 RIMS, RIMS1-RIMS34, arranged in and outside of Europe monitors the signals of GPS satellites, two of which, GPS-Sat1 and GPS-SAT2, are exemplary illustrated. With the GPS signals, measurements are carried by the RIMS, which measurements serve for determining correction data and integrity information for GPS.

The measurement data of the RIMS are transmitted via data connections to the two illustrated MCCs, MCC1 and MCC2, of EGNOS. Each MCC has a CPF and an MGF. The CPF determines correction data and integrity information for GPS for each of the EGNOS satellites EGNOS-SAT1 and EGNOS-SAT2, each of which provide different regions with correction data and integrity information.

In addition, the MCCs MCC1 and MCC2 each have an MGF with which EGNOS messages can be generated, which are made available to the uplink stations for transmission to the EGNOS satellites EGNOS-SAT1 and EGNOS-SAT2.

Per EGNOS, satellite EGNOS-SAT1 and EGNOS-SAT2, in each case two uplink stations NLES1 and NLES2, and NLES3 and NLES4, respectively, are provided, one of which serves as redundancy. The uplink stations NLES1 and NLES3 transmit the EGNOS messages generated by a selected CPF and provided to the respective MGF to the respective EGNOS satellite EGNOS-SAT1 and/or EGNOS-SAT2 which, in turn, distribute a data stream comprising EGNOS user messages in the region that is serviced by the satellites.

According to EGNOS, different types of EGNOS user messages are provided. Through the message types 2-5, fast corrections for the individual GPS satellites are transmitted. With one of the message types 2-5, fast corrections for up to 13 satellites can be transmitted. The current constellation of GPS provides 32 operational satellites so that at least the message types 2, 3 and 4 have to be transmitted. Here, the message types 2 and 3 contain data for fast corrections of in each case 13 GPS satellites, and message type 4 contains data for fast corrections of the remaining 6 GPS satellites.

The method according to the invention for generating a data stream comprising user messages is now explained in detail with reference to the flow diagram illustrated in FIG. 2 and the SBAS illustrated in FIG. 1.

In a first step S10, two predetermined unique sequences 2, 3 and 3, 2 are now formed from the two message types 2 and 3, which have to be transmitted with each data stream comprising EGNOS user messages, namely with a relatively short repetition period and thus quite frequently because with them, fast corrections have to be transmitted to the EGNOS receivers. The formed sequences are then also allocated in step S10 to the MGFs of the MCC. For example, the MGF of the MCC1 can be allocated the sequence 2, 3 and the MGF of the MCC2 can be allocated the sequence 3, 2 (a reverse allocation is possible as well; however, it is important that a unique sequence is allocated to only one data source so that a data source can be clearly identified).

Due to the allocation, the MGFs now generate sequences of EGNOS user messages in such a manner that they exhibit the unique sequence that is allocated to the respective MGF and belongs to the message types 2 and 3. For example, the MGF of the MCC1 generates sequences of EGNOS user messages in such a manner that they exhibit EGNOS user messages of the types 2-3 in the sequence 2, 3, thus, for example, 1, 2, 3, 4, 6, 7, 9, 10 (1, 6, 7, 9 and 10 are further EGNOS message types). Accordingly, the MGF of the MCC2 generates EGNOS user messages in such a manner that they exhibit EGNOS user messages of the types 2-3 in the sequence 3, 2, thus, for example 1, 3, 2, 4, 6, 7, 9, 10 (1, 6, 7, 9 and 10 are further EGNOS message types).

In step S12, the CPF and MGF of the MCC1 is selected by the NLES1 as data source for generating a data stream comprising EGNOS user messages. Thereupon, the MGF of the MCC1 generates a data stream comprising EGNOS user messages in the sequence 1, 2, 3, 4, 6, 7, 9, 10 (step S14), which data stream is transmitted by the NLES1 to the EGNOS satellite EGNOS-SAT1 so that the data stream can be distributed by said satellite in the region of the latter. Thus, by receiving the distributed data stream and recognizing the sequence of the message types 2 and 3, it is possible for receiver systems in the regions serviced by the EGNOS satellite EGNOS-SAT1 to identify the CPF and MGF of the MCC1 as the data source of the EGNOS user messages. Accordingly, the NLES3 can select the CPF and MGF of the MCC1 as data sources (step S12), as a result of which the MGF in the MCC2 generates a data stream comprising EGNOS user messages in the sequence 1, 3, 2, 4, 6, 7, 9, 10 for distribution through the EGNOS satellite SAT2 (step S14) so that receiver systems in the region serviced by this EGNOS satellite can identify the CPF and MGF of the MCC2 as the data source of the EGNOS user messages.

In general, with the three message types 2-4, in total, the following 3×2=6 different sequences can be generated which, accordingly, can be allocated to six different MGFs and/or CPFs:

| Predetermined sequence |
| --- |
| 2, 3, 4 |
| 2, 4, 3 |
| 3, 4, 2 |
| 3, 2, 4 |
| 4, 2, 3 |
| 4, 3, 2 |

Thus, it is principally possible to generate six different data streams comprising EGNOS user messages if a repetition period of the messages is used for identification. If two repetition periods of the messages are used for identification, it is even possible to generate (3×2)×(3×2)=36 distinguishable data streams comprising EGNOS user messages.

FIG. 3 shows a device for generating, according to the invention, a data stream comprising user messages as it can be used in the SBAS shown in FIG. 1. The device has first means 10 for forming the two predetermined unique sequences of the message types 2, 3, and 3, 2 and for allocating them as data sources to the CPF and MGF of the MCC1 and the MMCC2. The first means 10, for example, can be implemented as a computer program that contains data about all different data sources in the EGNOS-SBAS and based on this forms the predetermined unique sequences and allocates them to the CPF and MGF of the MCCs. Furthermore, as second means, the device has an NLES which selects the CPF and the MGF of one of the two MCCs MCC1 and MCC2 as data sources for generating the data stream. Finally, the MGFs of the two MCCs MCC1 and MCC2 are provided as third means for generating the data stream. The MGFs generate the data stream comprising EGNOS user messages by using the predetermined unique sequence of message types that is allocated by said means 10, i.e., the MGF of the MCC1 uses the sequence 2, 3 and the MGF of the MCC2 uses the sequence 3, 2.

An advantage of identifying a data source on the basis of the sequence of message types in the data stream comprising EGNOS user messages is that no new interface has to be defined. Rather, through appropriate software customizations, EGNOS receiver systems can be put in the position to carry out the identification of the data source as described above.

With the present invention, the identification of data sources of user messages in a satellite-based augmentation system for a global navigation satellite system is made possible without introducing a new interface. As a result of this, for example in the case of EGNOS, an MGF can determine which MGF was just selected by an NLES for the provision of data for the respective EGNOS satellite.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMBERS AND ACRONYMS 10 first means
GPS-SAT1 GPS satellite
GPS-SAT2 GPS satellite
EGNOS-SAT1 EGNOS satellite
EGNOS-SAT2 EGNOS satellite
RIMS1-RIMS34 network of RIMS
MGF third means
NLES second means
NLES1 NLES uplink station
NLES2 NLES uplink station
NLES3 NLES uplink station
NLES4 NLES uplink station
MCC1 first MCC
MCC2 second MCC
CPF Central Processing Facility
EGNOS European Geostationary Navigation Overlay Service
GNSS Global Navigation Satellite System
MCC Master Control Center
MGF Message Generation Facility
MSAS Multifunctional Satellite Augmentation System
NLES Navigation Land Earth Station SBAS Satellite-Based Augmentation System
WAAS Wide Area Augmentation System

What is claimed is:

1. A method for generating a data stream comprising user messages in a satellite-based augmentation system, wherein the user messages have different message types, the method comprising the steps:
   forming, by a computer, a plurality of predetermined unique sequences of message types;
   allocating, by the computer, each of the plurality of predetermined unique sequences to one of a plurality of data sources that are used for generating user messages in the satellite-based augmentation system;
   selecting, by an earth station, one of the plurality of data sources for generating a data stream comprising user messages; and
   generating, by the selected data source, the data stream comprising user messages by using the predetermined unique sequence of message types that is allocated to the selected data source,
   wherein the message types used for forming unique sequences are message types that are required to be included in each data stream comprising user messages, and
   wherein each of the plurality of data sources include a messaging generating device that generates the data stream.

2. The method according to claim 1, wherein the message types are those provided for transmitting fast corrections of satellites of an augmented global navigation satellite system.

3. The method according to claim 1, wherein the number of the message types used is selected on the basis of the number of data sources that are allocated a unique sequence of message types.

4. The method according to claim 1, wherein the method is performed in an augmentation system conforming to European Geostationary Navigation Overlay Service (EGNOS) V3 phase A.

5. A computer program product for generating a data stream comprising user messages in a satellite-based augmentation system, wherein the user messages have different message types, wherein the computer program product is stored on a non-transitory computer-readable medium, which when executed by a processor causes the processor to:
   form a plurality of predetermined unique sequences of message types;
   allocate each of the plurality of predetermined unique sequences to one of a plurality of data sources that are used for generating user messages in the satellite-based augmentation system;
   select one of the plurality of data sources for generating a data stream comprising user messages; and
   generate, by the selected data source, the data stream comprising user messages by using the predetermined unique sequence of message types that is allocated to the selected data source,
   wherein the message types used for forming unique sequences are message types that are required to be included in each data stream comprising user messages.

6. The computer program product according to claim 5, wherein the message types are those provided for transmitting fast corrections of satellites of an augmented global navigation satellite system.

7. The computer program product according to claim 5, wherein the number of the message types used is selected on the basis of the number of data sources that are allocated a unique sequence of message types.

8. The computer program product according to claim 5, wherein the processor is a component of an augmentation system conforming to European Geostationary Navigation Overlay Service (EGNOS) V3 phase A.

9. A device for generating a data stream comprising user messages in a satellite-based augmentation system, wherein the user messages have different message types, the device comprising:
   means forming a plurality of predetermined unique sequences of message types and allocating each of the plurality of predetermined unique sequences to one of a plurality of data sources that are used for generating user messages in the satellite-based augmentation system;
   means selecting one of the plurality of data sources for generating a data stream comprising user messages; and
   means generating, by the selected data source, the data stream comprising user messages by using the predetermined unique sequence of message types that is allocated to the selected data source,
   wherein the message types used for forming unique sequences are message types that are required to be included in each data stream comprising user messages.

10. The device according to claim 9, wherein the message types are those provided for transmitting fast corrections of satellites of an augmented global navigation satellite system.

11. The device according to claim 9, wherein the number of the message types used is selected on the basis of the number of data sources that are allocated a unique sequence of message types.

12. The device according to claim 9, wherein the device is part of an augmentation system conforming to European Geostationary Navigation Overlay Service (EGNOS) V3 phase A.

* * * * *